United States Patent
Uematsu et al.

(10) Patent No.: US 9,130,415 B2
(45) Date of Patent: Sep. 8, 2015

(54) ELECTRIC MOTOR WITH BALANCE ADJUSTMENT MECHANISM FOR ROTOR AND MANUFACTURING PROCESS THEREOF

(71) Applicant: FANUC CORPORATION, Yamanashi (JP)

(72) Inventors: Hidetoshi Uematsu, Yamanashi (JP); Yasuo Kawai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 217 days.

(21) Appl. No.: 13/958,020

(22) Filed: Aug. 2, 2013

(65) Prior Publication Data

US 2014/0035403 A1 Feb. 6, 2014

(30) Foreign Application Priority Data

Aug. 3, 2012 (JP) ................................. 2012-172940

(51) Int. Cl.
*H02K 15/16* (2006.01)
*H02K 7/04* (2006.01)
*F16B 19/00* (2006.01)

(52) U.S. Cl.
CPC ............... *H02K 7/04* (2013.01); *H02K 15/165* (2013.01); *F16B 19/004* (2013.01); *Y10T 29/49009* (2015.01); *Y10T 29/49012* (2015.01)

(58) Field of Classification Search
CPC ...... F16B 19/004; F16B 21/12; F16B 21/125; F16B 2021/14; F16F 1/028; Y10T 29/49012; Y10T 29/49009; H02K 7/04; H02K 15/165
See application file for complete search history.

(56) References Cited

U.S. PATENT DOCUMENTS 3,099,876 A * 8/1963 Lawless ........................... 29/229
7,398,584 B2 * 7/2008 Katou .............................. 29/252

FOREIGN PATENT DOCUMENTS

| JP | 56108365 | 8/1981 |
| JP | 59141468 U | 9/1984 |
| JP | 2000-321162 | 11/2000 |
| JP | 2003-319624 A | 11/2003 |
| JP | 2008298199 A | 12/2008 |
| WO | WO 8904078 A1 * | 5/1989 |

OTHER PUBLICATIONS

Office Action mailed Apr. 22, 2014, corresponds to Japanese patent application No. 2012-172940.

* cited by examiner

*Primary Examiner* — Livius R Cazan
(74) *Attorney, Agent, or Firm* — Lowe Hauptman & Ham, LLP (57) ABSTRACT

An electric motor includes an insert member situated within an insert bore formed in a rotor in order to adjust a balance of the rotor. The insert member has a body part provided with a cutout portion in a part of its circumference to define a gap extending therebetween. The insert member also has a pair of inner protrusions protruding radially inwardly from the opposite side edges of the gap. The size of the gap is determined such that the gap is not closed when the insert member elastically deforms and as a result, the outer diameter of the insert member becomes smaller than the diameter of the insert bore.

2 Claims, 9 Drawing Sheets

ELECTRIC MOTOR WITH BALANCE ADJUSTMENT MECHANISM FOR ROTOR AND MANUFACTURING PROCESS THEREOF

RELATED APPLICATIONS

The present application is based on, and claims priority from, Japanese Application Number 2012-172940, filed Aug. 3, 2012, the disclosure of which is hereby incorporated by reference herein in its entirety.

BACKGROUND OF THE INVENTION

1. Field of the Invention

The present invention relates to an electric motor and a manufacturing process thereof.

2. Description of the Related Art

An electric motor for rotating a rotor requires a balance of the rotor with high precision. For example, if the center of gravity of the rotor is shifted from a rotational axis, the electric motor generates vibration during rotational movement of the rotor, resulting in an unstable operation. JP-B-3621929 has proposed a method for adjusting a balance of the rotor.

There is a need for an electric motor which allows a balance of a rotor to be adjusted in a simple way and a process for manufacturing such an electric motor.

SUMMARY OF THE INVENTION

According to a first aspect of the present invention, an electric motor comprises an insert member having a cylindrical body part and positioned in an insert bore extending from at least one end surface of a rotor toward the other end surface and parallel to a central axis of the rotor, wherein the body part of the insert member is provided with a cutout portion in a part of circumference thereof to define a gap extending parallel to the central axis, and wherein the body part of the insert member further includes a pair of inner protrusions protruding radially inwardly from the opposite side edges of the gap.

According to a second aspect of the present invention, in the electric motor according to the first aspect, the body part of the insert member is sized so as to have an outer diameter greater than a diameter of the insert bore, the insert member is elastically deformable such that the outer diameter of the body part becomes smaller than the diameter of the insert bore, and the size of the gap defined by the body part of the insert member is determined such that the gap is not closed when the insert member elastically deforms and as a result, the outer diameter of the body part becomes smaller than the diameter of the insert bore.

According to a third aspect of the present invention, in the electric motor according to the first or second aspect, the body part of the insert member partly has a flat surface.

According to a fourth aspect of the present invention, a process for manufacturing the electric motor according to claim 1 comprises inserting the insert member to the insert bore by using a jig having an outer diameter smaller than an inner diameter of the body part of the insert member, the jig being provided with a groove capable of receiving the pair of inner protrusions of the insert member, wherein the groove of the jig is adapted to receive the pair of inner protrusions by elastically deforming the insert member so as to have the outer diameter of the body part of the insert member smaller than the diameter of the insert bore.

According to a fifth aspect of the present invention, the process according to the fourth aspect for manufacturing the electric motor according to the third aspect further comprises positioning the insert member and the jig relative to each other in a circumferential direction with the aid of the flat surface of the body part of the insert member.

These and other objects, features and advantages of the present invention will become more apparent in light of the detailed description of exemplary embodiments thereof as illustrated by the drawings.

DETAILED DESCRIPTION OF THE INVENTION

Embodiments of the present invention will be described below with reference to the accompanying drawings. Constituent elements of the illustrated embodiments may be modified in size from the practical application for better understanding.

Figure 10:
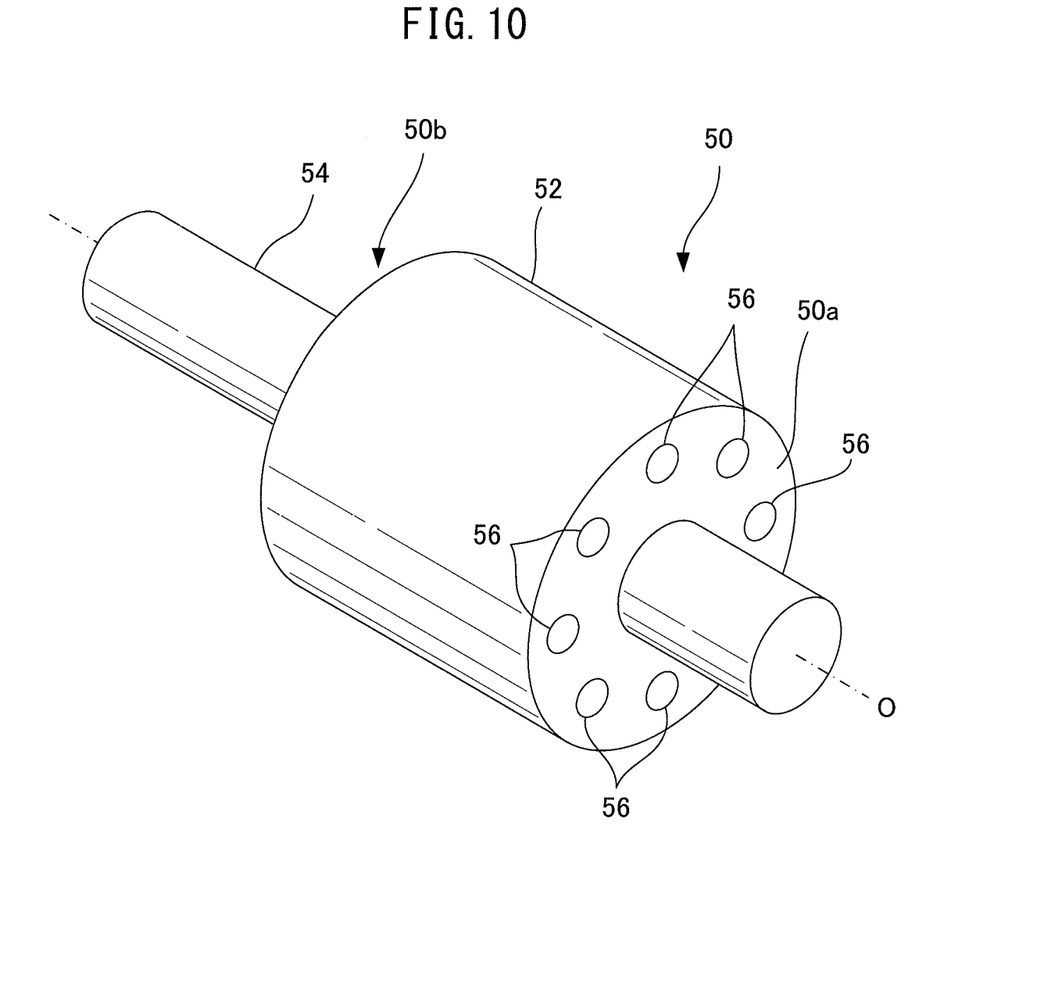
FIG. 10 is a perspective view schematically illustrating a rotor of an electric motor.

First, referring to FIG. 10, an exemplary rotor of an electric motor to which the present embodiments can apply will be described. FIG. 10 is a perspective view schematically illustrating a rotor 50 of the electric motor. The rotor 50 includes an iron core 52 substantially having a cylindrical shape, and a rotational shaft 54 extending through a hollow portion of the iron core 52. The rotor 50 rotates around a central axis O shown by alternating dots and short lines.

The rotor 50 has an end surface 50a provided with an insert bore 56 extending toward an opposite end surface 50b. The insert bore 56 is formed so as to extend substantially parallel to the central axis O of the rotor 50. The insert bore 56 extends through the rotor 50, for example, in a longitudinal direction of the rotor 50, i.e., a direction parallel to the central axis O. However, in another embodiment, the insert bore 56 of the rotor 50 may also be a recess with a bottom, instead of a through hole. For example, only one of the end surfaces 50a may be provided with such a recess, or both of the end surfaces 50a and 50b may also be provided with the recesses, respectively. Although in the illustrated embodiment, eight through holes 56 (one of the through holes cannot be seen in the drawing since it is behind the rotational shaft 54) are provided so as to be substantially equally spaced apart from each other in a circumferential direction, the number and the arrangement of the inert bores 56 may be modified as necessary.

To the insert bore 56, an insert member, which will be described below, is inserted and mounted in position. The number of the insert members depends on the necessity and those insert members are mounted in position to serve as a weight for adjusting a balance of the rotor 50. Accordingly, the insert members may be mounted to all of the insert bores 56 formed in the rotor 50, or to only some of the insert bores 56. A plurality of insert members may also be mounted together to one or more of the insert bores.

Figure 1:
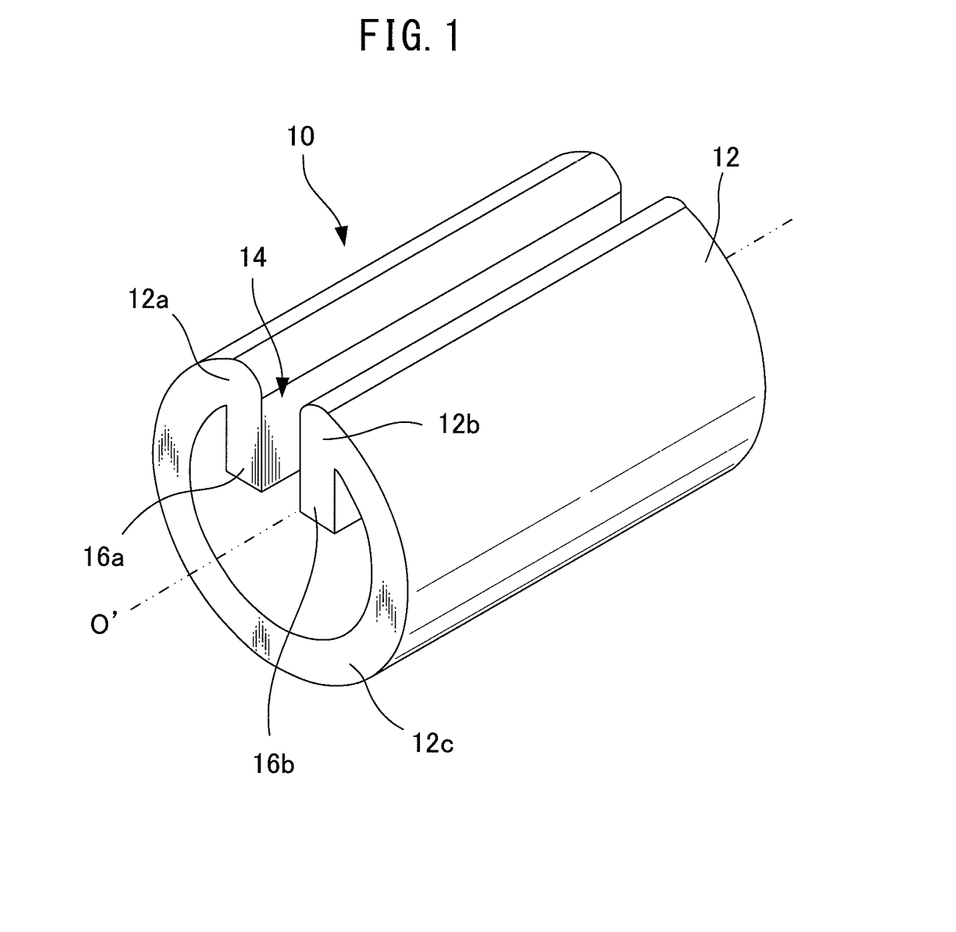
FIG. 1 is a perspective view illustrating a spring pin used for a rotor of an electric motor according to a first embodiment.
Figure 2:
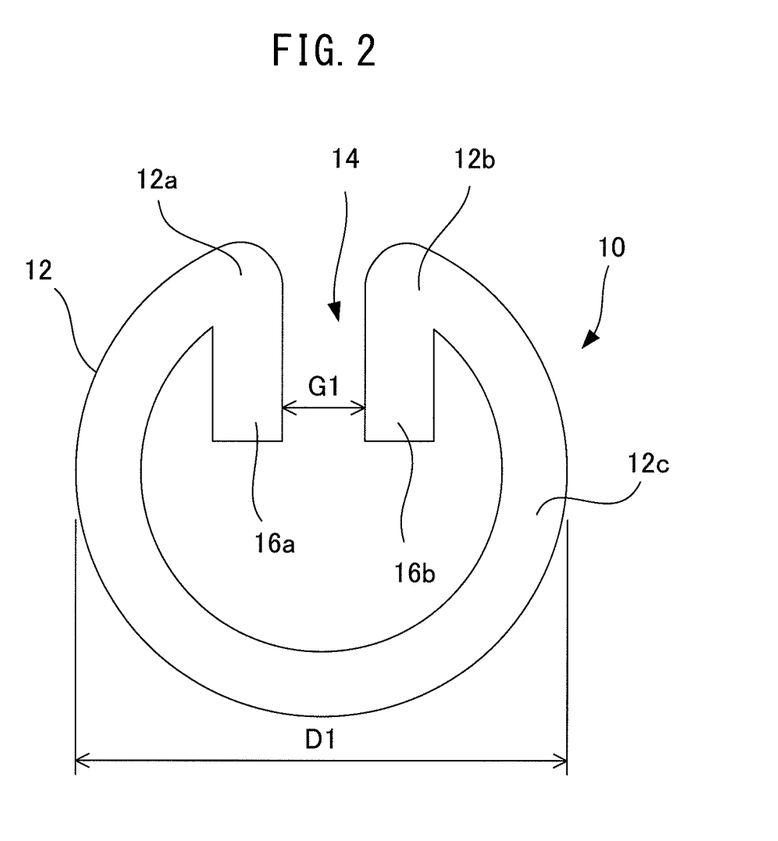
FIG. 2 is an end view illustrating the spring pin shown in FIG. 1.

Next, a spring pin used as the insert member for adjusting a balance of the rotor 50 will be described by way of example. FIG. 1 is a perspective view illustrating a spring pin 10 according to a first embodiment used for a rotor of an electric motor. FIG. 2 is an end view illustrating the spring pin 10 shown in FIG. 1. The spring pin 10 has a body part 12 substantially having a cylindrical shape, a part of circumference of which is cut out. More specifically, the body part 12 of the spring pin 10 substantially has a C-shape in cross section as illustrated, with a first circumferential edge 12a, a second circumferential edge 12b oppositely spaced apart from the first circumferential edge 12a and a circular arc portion 12c continuously extending between the first circumferential edge 12a and the second circumferential edge 12b to define a circumferential wall of the body part 12.

As shown in FIG. 1, the body part 12 of the spring pin 10 also has a first inner protrusion 16a and a second inner protrusion 16b which extend radially inwardly from the first circumferential edge 12a and the second circumferential edge 12b, respectively. A gap 14 defined between the first circumferential edge 12a and the second circumferential edge 12b continuously extends between the first inner protrusion 16a and the second inner protrusion 16b. The gap 14 is formed over an entire length of the body part 12 of the spring pin 10 along a central axis O' of the body part 12. Thus, one of the side edges of the gap 14 is defined by the first circumferential edge 12a and the first inner protrusion 16a, while the other of the side edges of the gap 14 is defined by the second circumferential edge 12b and the second inner protrusion 16b. In the illustrated embodiment, the gap 14 substantially has the same size G1 over a region defined between the first circumferential edge 12a and the second circumferential edge 12b and a region defined between the first inner protrusion 16a and the second inner protrusion 16b. In another embodiment, the inner protrusions may be formed so as to incline relative to each other, so that the size of the gap gradually increases toward tip ends of the first inner protrusion and the second inner protrusion.

The outer diameter of the spring pin 10, i.e., the outer diameter D1 of the body part 12, is sized such that the outer diameter D1 is slightly greater than the diameter of the above-described insert bore 56 of the rotor 50 in the state where no external force acts on the spring pin 10. Nonetheless, since the gap 14 is formed in the body part 12 of the spring pin 10, it requires relatively smaller force to elastically deform the body part 12. Specifically, when the spring pin 10 is elastically deformed by bringing the first inner protrusion 16a and the second inner protrusion 16b toward each other in a direction to close the gap 14, the outer diameter of the body part 12 can be decreased to the extent that it becomes smaller than the diameter of the insert bore 56.

As described above, the spring pin 10 according to this embodiment is easily subjected to elastic deformation by providing the external force so as to move the first inner protrusion 16a and the second inner protrusion 16b toward each other, and as a result, the spring pin 10 can be small enough to be easily inserted to the insert bore 56. However, once the gap 14 between the first circumferential edge 12a and the second circumferential edge 12b is completely closed, it is substantially no longer possible to deform the spring pin 10 so as to decrease its diameter. Generally, as the size of the gap 14 increases, the extent to which the outer diameter of the spring pin 10 can decrease tends to become greater. On the other hand, if the size of the gap 14 is too big, it may take greater force to deform the spring pin 10, or structural strength of the spring pin 10 may be impaired. Therefore, the size of the gap 14 is determined, depending on various factors such as a material of the spring pin 10 and the size of the insert bore 56. In relation to the present embodiment, it is determined to ensure that the outer diameter of the spring pin 10 can be decreased to the size smaller than the diameter of the insert bore 56, while the gap 14 is not completely closed. It will be appreciated that a person skilled in the art can determine the specific size of each part of the spring pin 10 without undue burden, depending on any given specifications.

The material of which the spring pin 10 is made is not limited to any particular material. Any metal such as stainless steel, elastomer, plastic or any other material having appropriate elasticity and structural strength so as to achieve the intended effect(s) described in the present specification may be used.

Figure 3:
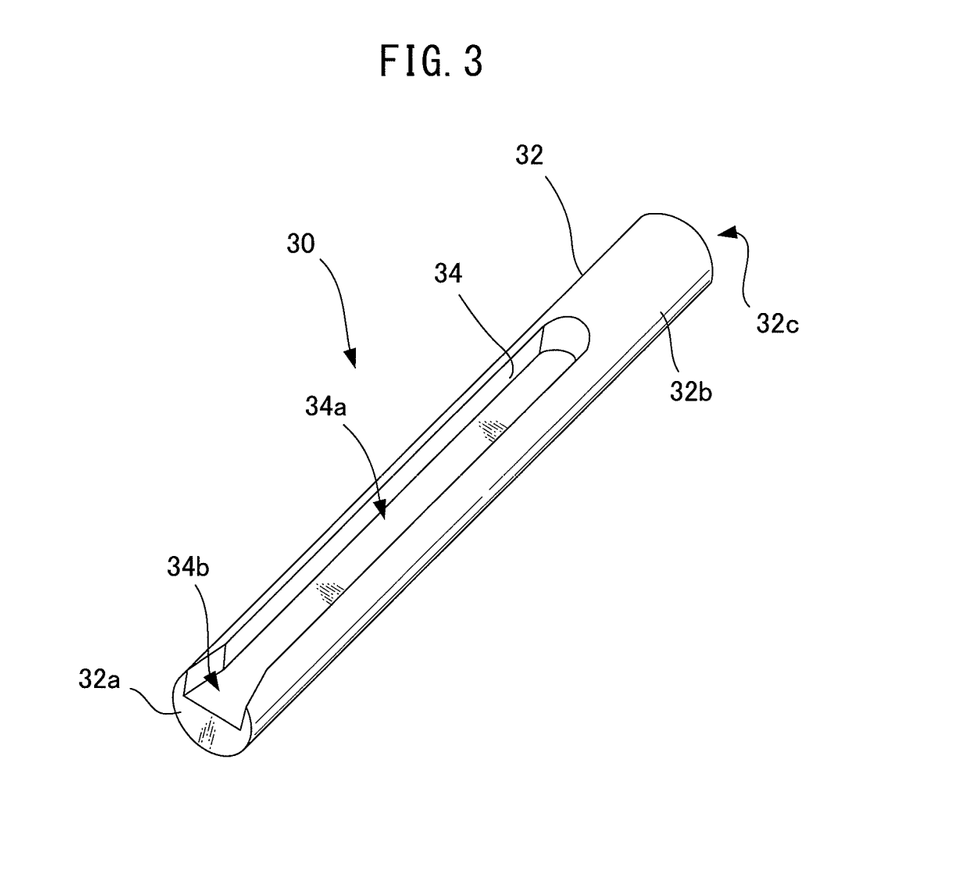
FIG. 3 is a perspective view illustrating a jig used for mounting the spring pin shown in FIG. 1 to the rotor.

FIG. 3 is a perspective view illustrating a jig 30 used for mounting the spring pin 10 shown in FIG. 1 to the rotor 50. The jig 30 is used to assist a process for mounting the spring pin 10 in position by inserting the spring pin 10 to the insert bore 56 of the rotor 50. The jig 30 has an elongated body part 32 substantially having a cylindrical shape, and is provided with a groove 34 formed on an outer circumferential surface 32b from one end surface 32a of the body part 32 along a longitudinal direction.

The groove 34 on the outer circumferential surface 32b of the jig 30 has a parallel portion 34a substantially having a constant width and constituting most of the groove 34, and a widened portion 34b having a width greater than that of the parallel portion 34a and being located close to the end surface 32a. Although the groove 34 extends partly from the end surface 32a toward the opposite end surface 32c in the illustrated embodiment, the groove 34 may also be provided over an entire length of the jig 30 defined from the end surface 32a to the opposite end surface 32c. In the latter case, the widened portion 34b may also be provided at the opposite end surface 32c. The jig 30 is formed from a material having relatively greater stiffness so as to make it more difficult for the jig 30 to deform than at least the spring pin 10. The material may include aluminum, iron, stainless steel and resin, for example.

Figure 4:
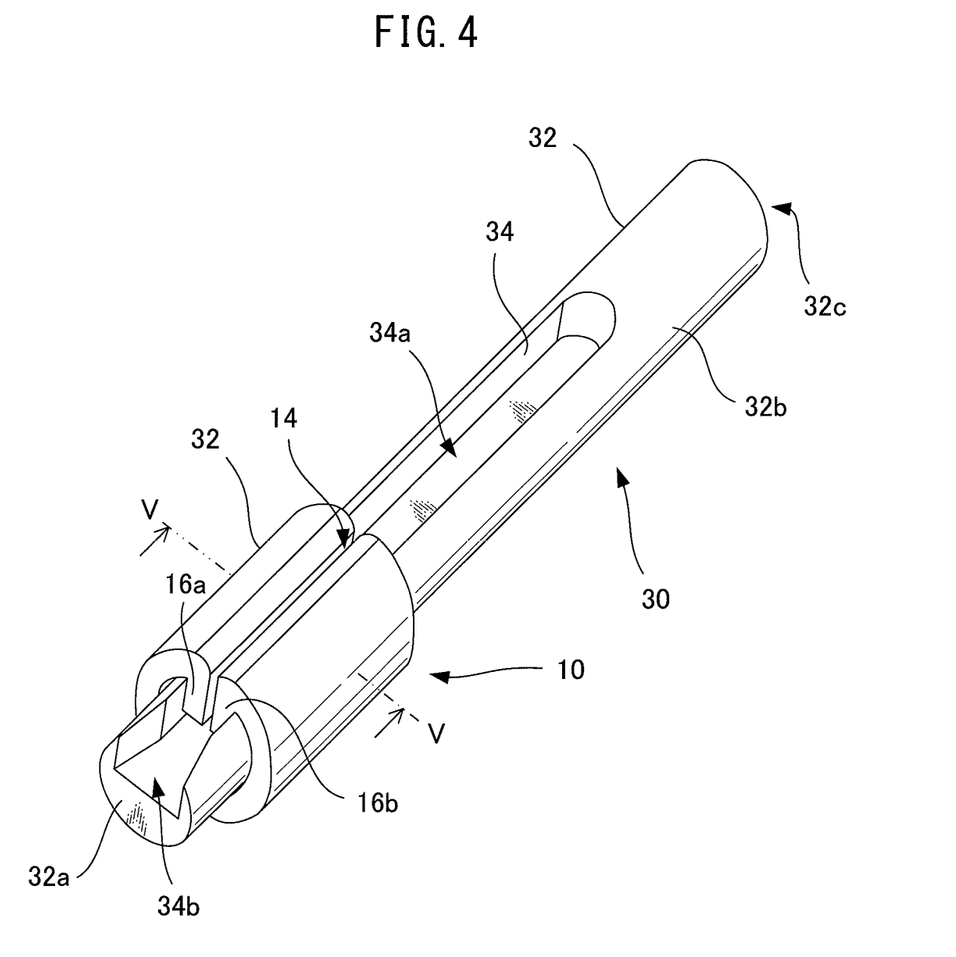
FIG. 4 is a perspective view illustrating the spring pin shown in FIG. 1 when mounted on the jig shown in FIG. 3.
Figure 5:
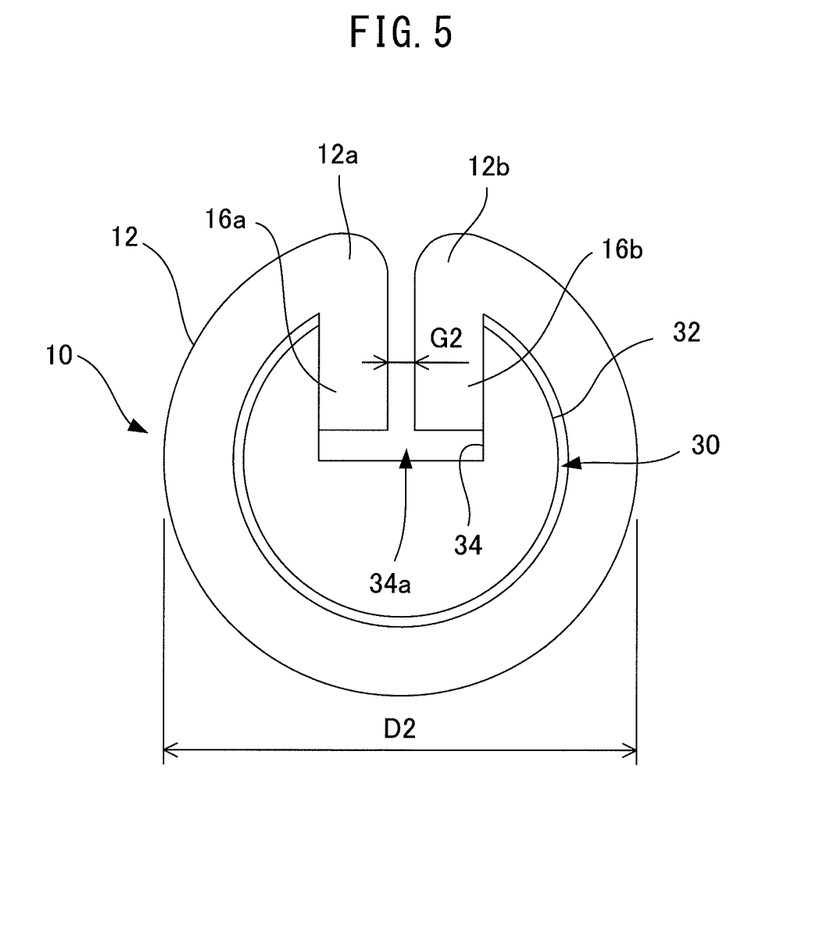
FIG. 5 is a sectional view taken along line V-V in FIG. 4.

The groove 34 of the jig 30 is adapted to receive the first inner protrusion 16a and the second inner protrusion 16b of the spring pin 10 when the spring pin 10 is mounted on the jig 30. FIG. 4 is a perspective view illustrating the spring pin 10 shown in FIG. 1 when mounted on the jig 30 shown in FIG. 3. FIG. 5 is a sectional view taken along line V-V in FIG. 4. Referring to FIG. 5, it can be seen that the first inner protrusion 16a and the second inner protrusion 16b abut the respective side edges of the parallel portion 34a of the groove 34.

In the state shown in FIG. 5, the size G2 of the gap 14 defined between the first inner protrusion 16a and the second inner protrusion 16b is smaller than the size G1 of the gap 14 in the state where no external force is applied thereto (see FIG. 2). Thus, the spring pin 10 is engaged with the groove 34 by being deformed so as to match the size of the width of the parallel portion 34a of the groove 34. Consequently, the first inner protrusion 16a and the second inner protrusion 16b are brought closer to each other. The width of the parallel portion 34a of the groove 34 is sized such that the outer diameter of the spring pin 10 is smaller than the diameter of the insert bore 56 of the rotor 50 described above in the state where the spring pin 10 is engaged with the groove 34 as shown in FIGS. 4 and 5.

The spring pin 10 is introduced to the groove 34 through the widened portion 34b formed on the end surface 32a of the jig 30. The widened portion 34b has side edges which are slanted in plan view such that the width of the widened portion 34b gradually decreases from the end surface 32a to the parallel portion 34a. Preferably, the widened portion 34b of the groove 34 on the end surface 32a is sized such that the widened portion 34b can receive the spring pin 10 when no external force is applied thereto. This allows the spring pin 10 to easily enter the groove 34 through the entry of the groove 34, i.e., the widened portion 34b. As passing through the widened portion 34b, the spring pin 10 is elastically deformed so as to narrow the gap 14 by the side walls of the widened portion 34b having the width which gradually decreases. In such a configuration, the process for introducing the spring pin 10 to the groove 34 is performed smoothly, and only relatively small force is required to press the spring pin into the groove 34. Therefore, the spring pin 10 and the jig 30 can be prevented from being damaged.

Figure 6:
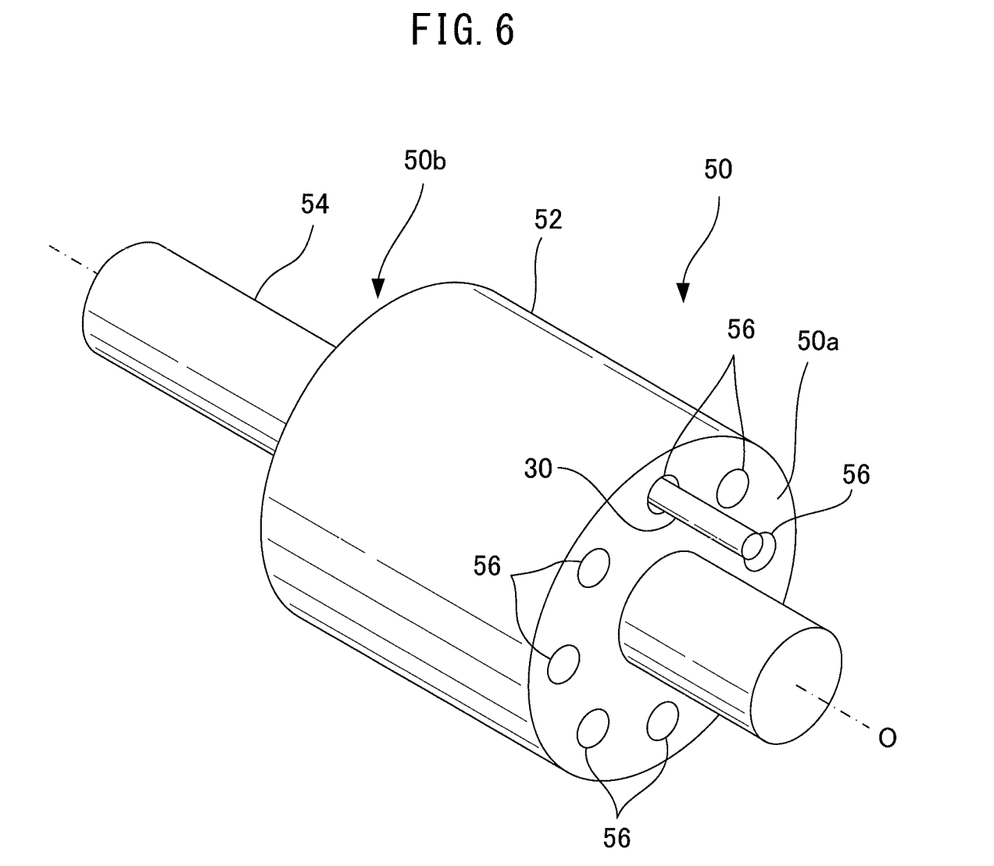
FIG. 6 is a perspective view schematically illustrating the state where the jig is inserted to an insert bore of the rotor.
Figure 7:
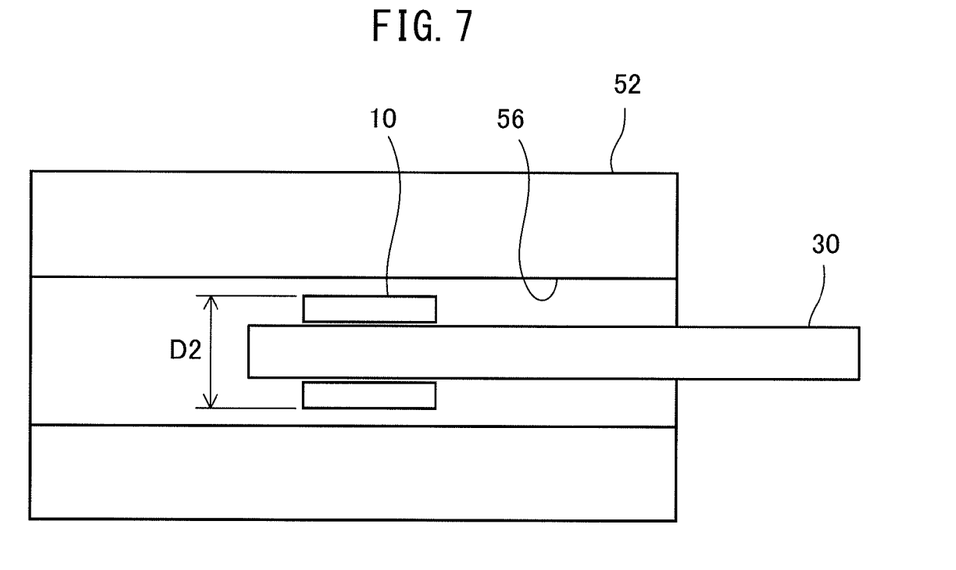
FIG. 7 is a sectional view schematically illustrating the state where the spring pin is inserted to the insert bore of the rotor together with the jig.

FIG. 6 is a perspective view schematically illustrating the state where the jig 30 is inserted to the insert bore 56 of the rotor 50. As described above in relation to FIGS. 4 and 5, the jig 30 is inserted to the insert bore 56 with the spring pin 10 engaged with the groove 34 of the jig 30. FIG. 7 is a sectional view schematically illustrating the state where the spring pin 10 is inserted to the insert bore 56 of the rotor 50 together with the jig 30. When mounted on the jig 30, the spring pin 10 has an outer diameter D2 smaller than the diameter of the insert bore 56, and therefore, the spring pin 10 can be easily moved to a predetermined position in the insert bore 56.

Figure 8:
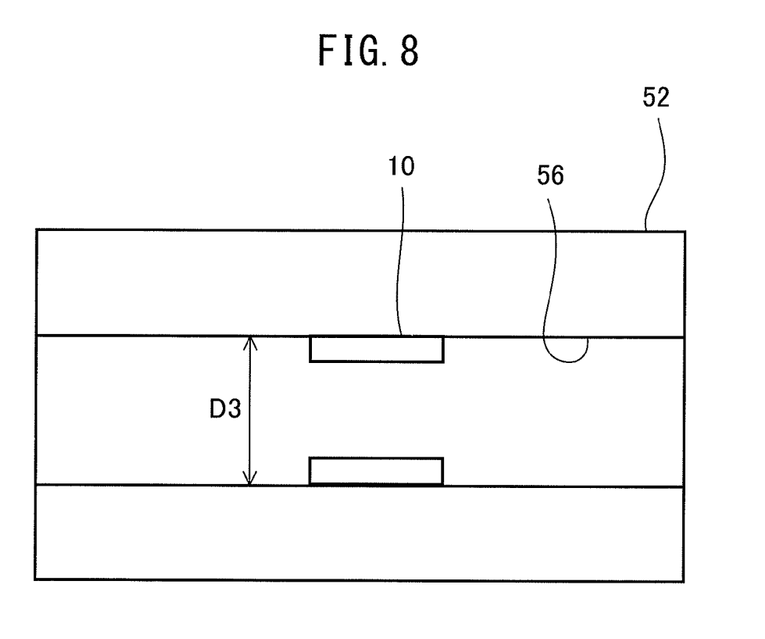
FIG. 8 is a sectional view schematically illustrating the state where the spring pin is mounted in the insert bore.

In the state shown in FIG. 7, the spring pin 10 is disengaged from the jig 30, while the spring pin 10 is held within the insert bore 56, and the jig 30 is pulled out of the insert bore 56. As a result, the spring pin 10 having the diameter D2 expands due to elastic restorative force so as to have a diameter D3 substantially equal to a diameter of an inner surface of the insert bore 56. FIG. 8 is a sectional view schematically illustrating the state where the spring pin 10 is mounted in the insert bore 56. In the state shown in FIG. 8, the spring pin 10 has the outer diameter D3 smaller than the outer diameter D1 in the state where no external force is applied thereto, and therefore, elastic restorative force acts on the inner wall of the insert bore 56 in a direction that increases the diameter of the spring pin 10. Therefore, the spring pin 10 is held in position by the force acting on the inner wall of the insert bore 56.

In the present embodiment, the spring pin 10 can be easily inserted to the insert bore 56 of the rotor 50 and mounted in position to assist adjusting a balance of the rotor 50. For example, strong force is required to press an insert member according to the related art, which does not have the first inner protrusion 16a and the second inner protrusion 16b, to the insert bore 56. In this case, the insert member may be deformed and damaged or the insert bore 56 may be damaged. In contrast, the spring pin 10 provided with the pair of inner protrusions 16a and 16b to define the gap 14 according to the present embodiment can be elastically deformed with small force so as to facilitate insertion to the insert bore 56 of the rotor 50. Accordingly, the processes for inserting the spring pin 10 to the insert bore 56 and for mounting the same can be efficiently carried out, and as a result, an inexpensive electric motor can be produced. On the other hand, the gap 14 defined by the body part 12 of the spring pin 10 is sized such that the spring pin 10 can be elastically deformed so that the spring pin 10 can be inserted to the insert bore 56. In addition, the spring pin 10 is held within the insert bore 56 by elastic restorative force of its own. Thus, a reliable electric motor can be provided.

According to the present embodiment, an additional process for providing the rotor with bores in order to adjust a balance of the rotor can be omitted. In the present embodiment, the insert bore 56 of the rotor 50 can be formed in the same pressing process to produce the iron core 52. This makes it possible to reduce the number of manufacturing steps, as opposed to the comparative process according to the related art in which bores are formed after a balance of the rotor is measured. The present embodiment is also advantageous in that there is no risk of chips which are produced during a cutting process being attached on the rotor. Further, as compared to the related art in which resin is provided on a side surface of the rotor to adjust a balance of the rotor, there is no need for processes for applying and hardening resin, and therefore an electric motor can be efficiently produced for a shorter period of time. Furthermore, as compared to the related art in which an externally threaded member is screwed into a threaded bore of the rotor to adjust a balance of the rotor, it is still advantageous in that there is no need for a process for forming such a threaded bore.

Next, other embodiments of the present invention will be described. In the following, matters that have already been described will be omitted from the explanation as necessary. Like elements are designated with the same referential numerals.

Figure 9:
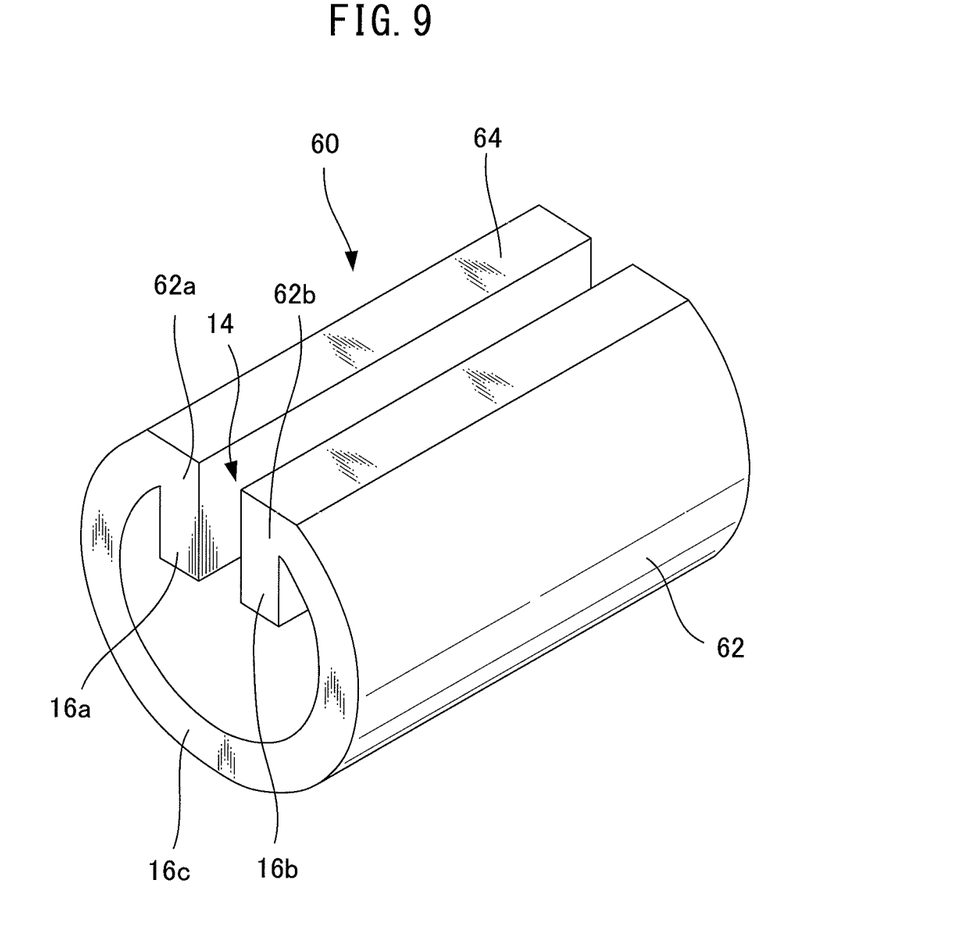
FIG. 9 is a perspective view illustrating a spring pin used for a rotor of an electric motor according to a second embodiment.

FIG. 9 is a perspective view illustrating a spring pin 60 according to a second embodiment used for the rotor 50 of the electric motor. The spring pin 60 in the present embodiment has a similar configuration as the spring pin 10 according to the first embodiment shown in FIGS. 1 and 2. Specifically, the spring pin 60 has a body part 62 of a substantially cylindrical shape with a part of its circumference cut out. The spring pin 60 has a pair of inner protrusions 16a and 16b extending radially inwardly from the body part 62. As described in relation to the first embodiment, the spring pin 60 is also intended for insertion to the insert bore 56 of the rotor 50, while the spring pin 60 is elastically deformed so as to bring the inner protrusions 16a and 16b closer to each other. In addition to the above described particulars, a detailed description of the same elements as those of the first embodiment will be omitted from the explanation.

As opposed to the first embodiment in which the first circumferential edge 12a and the second circumferential edge 12b of the spring pin 10 have curved surfaces so as to form a continuous portion of the circular arc portion 12c, the spring pin 60 in the present embodiment has flat portions 64 on the respective surfaces of the first circumferential edge 62a and the second circumferential edge 62b. The flat portions 64 are intended to assist in positioning the spring pin 60 and the above-described jig 30 relative to each other when the spring pin 60 is mounted on the jig 30. More specifically, by detecting the flat portions 64 of the spring pin 60, circumferential positions of the inner protrusions 16a and 16b can be easily determined. This allows a process for mounting the spring pin 60 to the jig 30 to be smoothly carried out, and therefore working efficiency can be improved.

EFFECT OF THE INVENTION

According to the first aspect, the insert member is provided with the pair of inner protrusions which protrude radially inwardly. Thus, the outer diameter of the insert member can be decreased with small force by elastically deforming the insert member so as to bring the pair of inner protrusions closer to each other. In this way, the insert member can be easily inserted to the insert bore. The process for insertion of the insert member can be efficiently carried out, and therefore working efficiency can be improved and an inexpensive electric motor can be provided.

According to the second aspect, the insert member can be inserted to the insert bore only when the insert member is subjected to elastic deformation. In addition, in the state where the insert member is provided in position in the insert bore, the insert member is held there by elastic restorative force acting in a direction that expands the diameter of the insert bore. The gap defined by the body part of the insert member is sized such that the insert member can be elastically deformed so as to allow the insert member to be inserted to the insert bore. Accordingly, a reliable electric motor can be provided.

According to the third aspect, the flat surface of the insert member facilitates determining a circumferential position of the insert member, and thus, working efficiency can be improved. As a result, an expensive electric motor can be provided.

According to the fourth aspect, the jig is used to expand the diameter of the insert member. The groove of the jig is sized such that the insert member can be inserted to the insert bore in the state where the inner protrusions are received on the groove. In this way, the insert member is elastically deformed with ease by mounting the insert member on the jig. Accordingly, the process for inserting the insert member to the insert bore can be carried out efficiently.

According to the fifth aspect, the insert member and the jig can be positioned relative to each other with the aid of the flat surface of the body part of the insert member. Therefore, the process for mounting the insert member on the jig can be carried out efficiently.

Although the invention has been shown and described with exemplary embodiments thereof, it should be understood by those skilled in the art that the foregoing and various other changes, omissions and additions may be made therein and thereto without departing from the spirit and scope of the invention.

The invention claimed is:

1. A process for manufacturing an electric motor, the electric motor comprising an insert member having a cylindrical body part and positioned in an insert bore extending from at least one end surface of a rotor toward the other end surface and parallel to a central axis of the rotor, the body part of the insert member being provided with a cutout portion in a part of the circumference thereof to define a gap extending parallel to the central axis, the body part of the insert member further comprising a pair of inner protrusions protruding radially inwardly from the opposite side edges of the gap, the process comprising inserting the insert member to the insert bore by using a jig having an outer diameter smaller than an inner diameter of the body part of the insert member, the jig being provided with a groove capable of receiving the pair of inner protrusions of the insert member, wherein the groove of the jig is adapted to receive the pair of inner protrusions by elastically deforming the insert member so as to have the outer diameter of the body part of the insert member smaller than the diameter of the insert bore.

2. The process according to claim 1 wherein the body part of the insert member partly has a flat surface, the process further comprising positioning the insert member and the jig relative to each other in a circumferential direction with the aid of the flat surface of the body part of the insert member.

* * * * *